United States Patent Office 3,716,246
Patented Feb. 13, 1973

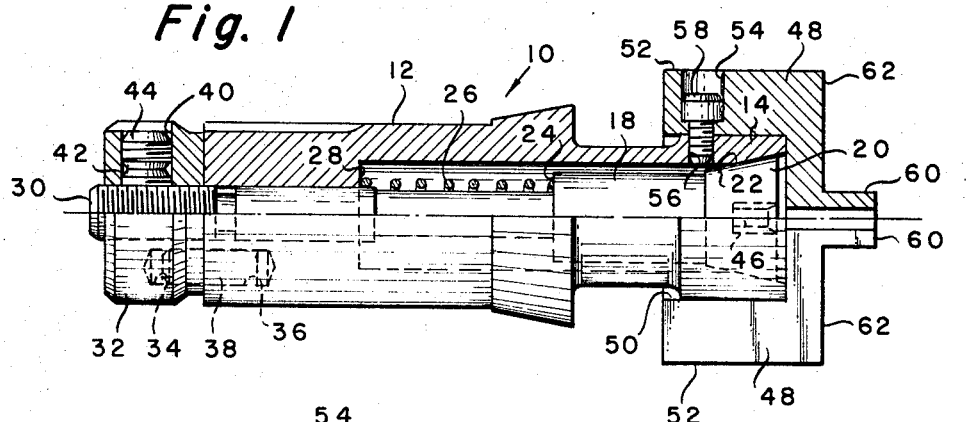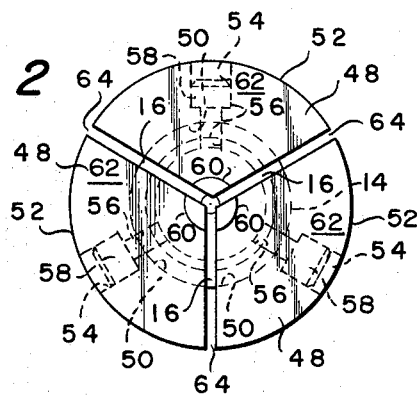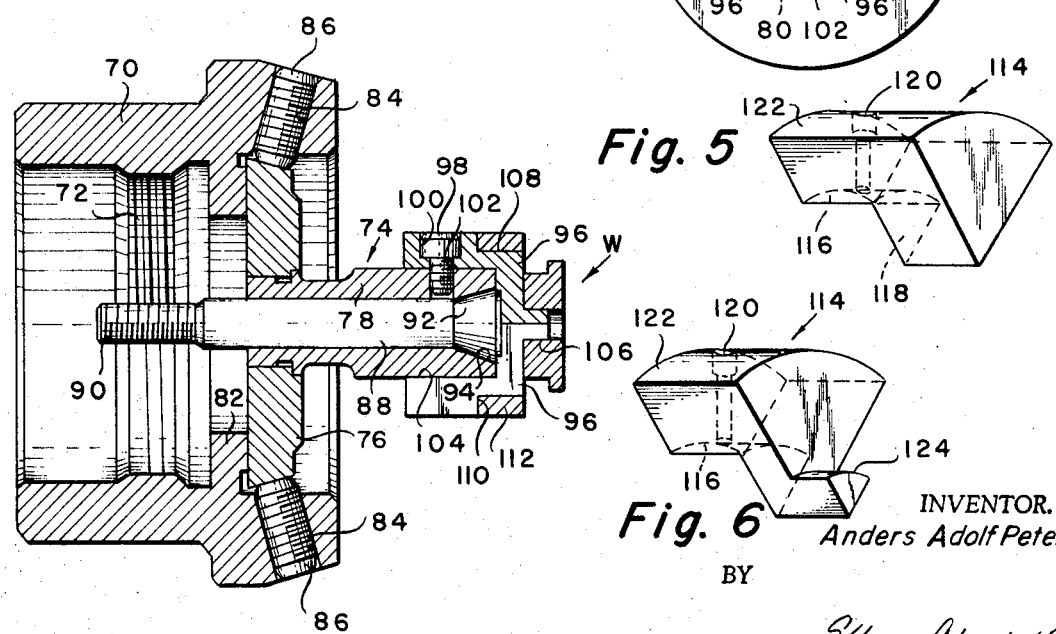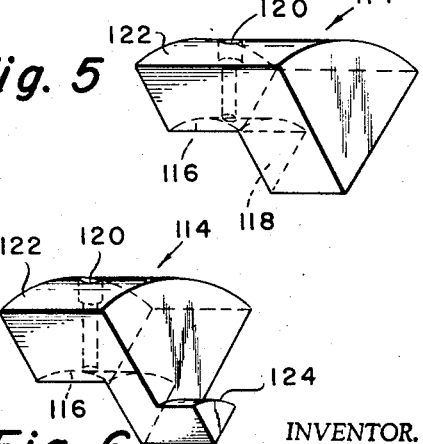
INVENTOR.
Anders Adolf Peterson

3,716,246
EXPANDING COLLET AND WORK GRIPPING ADAPTOR THEREFOR
Anders Adolf Peterson, Elmira, N.Y., assignor to Hardinge Brothers, Inc., Elmira, N.Y.
Filed Sept. 29, 1970, Ser. No. 76,431
Int. Cl. B25b 3/00
U.S. Cl. 279—2
12 Claims

ABSTRACT OF THE DISCLOSURE

An expanding collet for machine tools including a tubular body portion having a longitudinal axis and a plurality of slots dividing the tubular body portion into a hub portion and a plurality of fingers extending from the hub portion and having inner and outer surfaces, an adaptor member mounted on the outer surface of the free end of each of the fingers and extending beyond the free end of each of the fingers, each of the adaptor members having an inner surface coincident with the outer surface of the fingers, the adaptor members each including a portion beyond the free end of the fingers and extending radially inward toward the longitudinal axis, the adaptor members each including an outer surface longer than its respective inner surface.

BACKGROUND AND OBJECTS

This invention relates to an expanding collet for machine tools, and more particularly to an adaptor for use with an expanding collet.

Frequently in the machining industry, it is necessary to perform a machining operation on the external surface of a workpiece. In order to accomplish this, the workpiece is gripped internally by means of a hole bored in the workpiece. An expanding collet is used to grip this type of workpiece. The collet is inserted into the hole in the work piece, and is expanded radially to exert a radially outward gripping force on the workpiece. The expanding action of the collet is provided by means of a tapered draw plug cooperating with a correspondingly tapered surface on the expanding collet, so that as the draw plug is moved axially, the work gripping jaws of the collet expand radially.

This type of expanding collet has had a serious drawback in prior art constructions in that the diameter of the hole in the work piece had to be rather large in order to accept the work gripping jaws of the collet which were correspondingly large. The external diameter of the work gripping jaws has been limited in prior art constructions to a minimum of ½ inch since the draw plug is coaxial, coextensive and inside of the work gripping fingers of the collet. Thus, the existence of the draw plug within the tubular portion of the collet necessitates a relatively large external diameter.

If the external diameter of the work gripping fingers of the collet were reduced to accommodate smaller holes, the draw plug would have to be correspondingly reduced in size, and the net result would be an overall weakening of the collet or a reduction in the amount of work gripping force exerted upon the workpiece.

Accordingly, it is a primary object of this invention to provide an expanding collet which overcomes the disadvantages of the prior art expanding collets.

Another object of this invention is to provide an expanding collet which can hold work pieces from smaller diameter holes than is possible with prior art collets.

A further object of this invention is to provide an expanding collet having removable work gripping jaws.

Still another object of this invention is to provide an adaptor for use with an expanding collet.

Still a further object of this invention is to provide an adaptor for use with an expanding collet which may be machined to the desired dimension.

Yet another object of this invention is to provide an adaptor for expanding collets which may be machined in place on the collet to the desired work diameter and concentricity.

Yet a further object of this invention is to provide a work gripping adaptor having hardened work gripping surfaces.

Another object of this invention is to provide a segmented work gripping adaptor for an expanding collet, the segments of which may be locked in position prior to the turning of the adaptor to the desired dimension.

Still a further object of this invention is to provide a method of making a work gripping adaptor for an expanding collet.

These and other objects and advantages of this invention will become apparent when considered with the following specification and claims when taken together with the accompanying drawings in which:

FIG. 1 is a side elevation view partly in section of the expanding collet of this invention;

FIG. 2 is a right end view of the collet shown in FIG. 1;

FIG. 3 is a longitudinal section of an alternate embodiment of the collet of this invention;

FIG. 4 is a right end view of the embodiment of FIG. 3;

FIG. 5 is a perspective view of one of the jaws of the adaptor prior to turning; and FIG. 6 is a perspective view of one of the work gripping jaws of the adaptor of this invention after turning to the desired dimension.

DESCRIPTION OF THE INVENTION, FIGS. 1 and 2

Referring now to FIG. 1, an expanding collet generally designated 10 is shown and includes a tubular body portion 12 and a plurality of fingers 14 separated by slots 16. Positioned within the tubular body portion 12 is a draw plug 18 having a front portion 20, with a tapered external surface 22. The middle portion of the draw plug 18 is stepped so as to provide a shoulder 24. A compression spring 26 is provided around the draw plug 18, and operates against shoulder 24 of draw plug 18 and the shoulder 28 of the tubular body portion 12. This serves to urge the draw plug 18 toward the right as seen in the drawings.

The rear portion of the draw plug means is threaded externally as at 30 so as to engage nut 32. Adjacent bores 34 and 36 are provided in the nut 32 and the tubular body portion 12 for receiving a pin 38. This pin 38 serves to prevent relative rotation of the nut 32 and the tubular body portion 12 after assembly while still permitting axial reciprocation of the draw plug 18.

A radial, threaded hole 40 is provided in nut 32 for receiving a set screw 44 and a plug 42 to lock draw plug 18 in position.

To permit assembly of the collet, a square, hexagonal, or other shaped hole 46 is provided in the right end of draw plug 18 to permit insertion of a wrench for threading the draw plug 18 into the nut 32.

Attached to the right end of the collet 10 as viewed in the drawings are a plurality of adaptors 48. The adaptors have internal surfaces 50 which are coincident with the external surface of the fingers 14. The outer surface 52 of each of the adaptor members 48 is interrupted by a counterbored hole which is positioned adjacent a corresponding hole 56 in each finger 14. The adaptor members 48 are secured to the respective fingers 14 by means of bolts 58 passing through holes 54 and threaded into holes 56. A work gripping surface 60 is provided on the front face 62 of each of the adaptors 48. As may be readily seen in FIG. 1, the radius of the work gripping portion 60 of the adaptor may be substantially smaller than the radius of the draw plug. The outer surfaces 52 of the adaptors 48 as well as the work gripping surface 60 are arcuate in the drawings but it is obvious that these outer surfaces 52 and 60 may have other configurations.

As seen in FIG. 2, the adaptors 48 are separated by slots 64 extending radially outward from the longitudinal axis of the collet. While the adaptors shown in FIGS. 1 and 2 are shown to have opened slots 64, the adaptors could be readily made so as to have closed slots as in FIG. 4, if the diameter of the hole in the workpiece is small enough to necessitate a still smaller diameter work gripping surface 60 as will be subsequently explained.

MODIFICATION—FIGS. 3 to 6

Referring now to FIGS. 3 and 4, a spindle collar is shown which may be attached to the spindle of a machine tool (not shown) by the thread connection 72. A collet generally designated 74 is seen to have a hub portion 76 and the plurality of fingers 78 extending therefrom. The fingers are separated by slots 80. The back of the hub 76 rests against a flange 82 in the spindle collar 70, and a plurality of threaded holes 84 are provided in the spindle collar 70. The holes 84 are adapted to receive screws 86 which may be individually adjusted to adjust the concentricity of the rotating collet 74.

The draw plug 88 includes a threaded rear portion 90 and the tapered front portion 92. The tapered portion 92 cooperates with the correspondingly tapered portion 94 of the collet. Thus, reciprocation of the draw plug 88 results in radial reciprocation of the fingers 78.

In a manner similar to that shown in FIG. 1, each of the plurality of the adaptors 96 are secured to the respective fingers 78 by means of a bolt 98 passing through the counterbored hole 100 in the adaptor members 96 and a corresponding hole 102 in the fingers 78.

The adaptors 96 include an inner surface 104 which is coincident with the outer surface of the fingers 78. A work gripping surface 106 is provided on each of the adaptor members 96. In FIG. 3, a work piece W is shown mounted in place on the work gripping surface 106.

The outer surface 108 of the adaptor members 96 has machined therein an annular recess 110 which may receive a locking ring 112. Although this annular recess 110 and the locking ring 112 is shown in the embodiment of FIG. 3, it is clear that it may be utilized with the embodiment shown in FIG. 1 as well. The purpose of the locking ring 112 is to hold the adaptors 96 in a fixed relative relationship and in a rigid manner while the work gripping surface 106 is turned to the proper diameter. Obviously, a jig or other holding means may be used to hold the adaptors 96 during turning operations. After the work gripping surface 106 has been machined, the locking ring 112 is removed, and the collet is ready for use. If the locking ring modification is utilized, soft steel is preferred for the adaptor members 96 to permit turning them in place which serves to assure that the work gripping surface 106 will be concentric with the axis of rotation.

On the other hand, if a standard diameter work hole was utilized in the work piece, hardened steel adaptor members 96 could be utilized for gripping the work piece inasmuch as the concentricity of the work gripping surface may be adjusted by means of the set screws 86 as previously described.

In producing the adaptor members 96, a generally cylindrical steel billet of a desired length is utilized and is bored or drilled axially and partially therethrough to a diameter the same as the outer fingers of the collet. After the boring, the billet is cut along longitudinal lines so as to produce adaptor members having the configuration shown in FIG. 5. The outer diameter and the bored recess are then refinished to working diameters with the segments repositioned in abutting relationship to constitute a new cylinder. The members 114 will then have surfaces 116 which are coincident with the outer surface of the fingers of the collet. The front face of the fingers abut against surface 118 in such a manner that the counterbored hole 120 would align corresponding hole on the collet finger. The outer surface 122 is seen to be substantially concentric with the surface 116. When the adaptors are mounted on the collet fingers, the slots will then be substantially closed allowing the turning of a smaller diameter work gripping surface.

After the adaptors 114 have been turned to produce the required diameter work gripping surface 124, each adaptor member 114 would appear as shown in FIG. 6. As mentioned earlier, these adaptor members could now be hardened in the usual manner if desired, or if need be, for a different workpiece, the work gripping surface 124 could be machined to an even smaller diameter, While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention of the limits of the appended claims.

What is claimed is:

1. An expanding collet for machine tools including:
   (a) a tubular body portion having a longitudinal axis and a plurality of slots dividing said tubular body portion into a hub portion and a plurality of fingers extending from said hub portion and having inner and outer surfaces,
   (b) an adaptor member mounted on said outer surface of the free end of each of said fingers,
   (c) each of said adaptor member comprising a body member including front, rear, and intermediate sections,
   (d) said front section including a front outer wall surface,
   (e) said rear section including outer and inner wall surfaces,
   (f) said intermediate section including outer and inner faces,
   (g) said front section including a front face,
   (h) said rear section including a rear face,
   (i) said body member having left and right planar side faces extending from front to rear and said side faces intersecting to for man edge at the bottom of said front section,
   (j) said rear section including a front half and a rear half,
   (k) a fastener receiving opening in said rear half of said rear section,
   (l) whereby a fastener positioned in said opening will engage said collet for securely and positively positioning said adaptor thereon against vibration and displacement forces, without interferring with operation of said collet.

2. An expanding collet as in claim 1 and wherein:
   (a) said rear outer and inner surfaces and said front outer surface are curved surfaces.

3. A collet as in claim 2 and wherein:
   (a) said front outer surface has a radius less than said rear outer and inner surfaces.

4. An expanding collet as in claim 2 and wherein:
   (a) said rear outer and inner surfaces and said front outer surface are concentric.

5. An expanding collet as in claim 2 and wherein:
   (a) the radius of said front outer surface is less than the radius of said tubular body portion.

6. An expanding collet as in claim 1 and including:
   (a) an annular recess formed in said outer face of said intermediate section for receiving a locking ring.

7. An expanding collet as in claim 6 and including:
(a) a locking ring positioned in said recess for rigidly securing said adaptor members in a fixed relationship.

8. An expanding collet for machine tools including:
(a) a tubular body portion having a longitudinal axis and a plurality of slots dividing said tubular body portion into a hub portion and a plurality of fingers extending from said hub portion and having inner and outer surfaces,
(b) an adaptor member mounted on said outer surface of the free end of each of said fingers and extending beyond said free end of each of said fingers,
(c) each of said adaptor members having an inner and outer surface coincident with said outer surface of said fingers,
(d) said adaptor members each including a portion beyond said free end extending radially inward towards said longitudinal axis,
(e) said adaptor members each including an outer surface longer than its respective inner surface,
(f) cam means reciprocable in said tubular body portion for moving said fingers and said members radially outwardly for gripping a workpiece,
(g) said adaptor members each including an additional outer surface extending forward of the outer surface of said adaptor members,
(h) said additional outer surface of each of said adaptor members being substantially arcuate and on a radius less than the radius of the outer surface of said adaptor members,
(i) the inner and outer surfaces and the additional outer surface of each of said adaptor members being concentric,
(j) the radius of said additional outer surface of each of said adaptor members being less than the radius of said tubular body portion,
(k) an annular recess formed in the outer surface of each of said adaptor members for receiving a locking ring,
(l) a locking ring positioned in said recess for rigidly securing said adaptor members in a fixed relationship, and
(m) each of said adaptor members including a linear portion lying on said longitudinal axis.

9. An expanding collet for machine tools as in claim 8 and wherein:
(a) said tubular body portion is substantially cylindrical, and
(b) said inner surface of each of said adaptor members is substantially arcuate and on a radius substantially the same as the radius of said tubular body portion.

10. An expanding collet for machine tools as in claim 9 and wherein:
(a) said outer surface of each of said adaptor members is substantially arcuate and on a radius substantially greater than the radius of said tubular body portion.

11. A work gripping adaptor for an expanding collet having a non-cam and a cam area, including:
(a) a body member including front, rear, and intermediate sections,
(b) said front section including a front outer wall surface,
(c) said rear section including outer and inner wall surfaces,
(d) said intermediate section including outer and inner faces,
(e) said front section including a front face,
(f) said rear section including a rear face,
(g) said body member having left and right planar side faces extending from front to rear and said side faces intersecting to form an edge at the bottom of said front section,
(h) said rear section including a front half and a rear half,
(i) a fastener receiving opening in said rear half of said rear section,
(j) whereby a fastener positioned in said opening will engage the non-cam area of said collet for securely and positively positioning said adaptor thereon against vibration and displacement forces, without interferring with said collet cam area.

12. A work gripping adaptor as in claim 11 and wherein:
(a) said rear outer and inner surfaces and said front outer surface are curved surfaces.

References Cited
UNITED STATES PATENTS

| | | | |
|---|---|---|---|
| 2,481,094 | 9/1949 | Edwards | 279—2 |
| 2,588,354 | 3/1952 | Buescher | 279—2 |
| 2,593,638 | 4/1952 | Westberg | 279—2 |
| 2,966,361 | 12/1960 | Phillips | 279—2 |
| 2,970,843 | 2/1961 | Bourguignon | 279—2 |
| 3,202,431 | 8/1965 | Moody | 279—2 |
| 3,514,116 | 5/1970 | Brinkman | 279—1 C |

GERALD A. DOST, Primary Examiner

U.S. Cl. X.R.

29—558; 82—44; 279—1 A